United States Patent [19]

Eatwell

[11] Patent Number: 4,795,024

[45] Date of Patent: Jan. 3, 1989

[54] CONVEYOR BELT SCRAPER UNITS

[75] Inventor: Neville A. W. Eatwell, Pretoria, South Africa

[73] Assignee: L.B.C. Services (Proprietary) Limited, Pretoria, South Africa

[21] Appl. No.: 836,963

[22] Filed: Mar. 6, 1986

[30] Foreign Application Priority Data

Jul. 3, 1985 [ZA] South Africa ............... 85/1727

[51] Int. Cl.⁴ ............................................. B65G 45/00
[52] U.S. Cl. ..................................... 198/499; 15/256.6
[58] Field of Search ............ 198/499; 15/256.5, 256.6; 474/92

[56] References Cited

U.S. PATENT DOCUMENTS

| 1,543,411 | 6/1925 | Wittig | 198/499 X |
| 3,101,837 | 8/1963 | Martin | 198/499 |
| 3,504,786 | 4/1970 | Matson | 474/92 X |
| 3,994,384 | 11/1976 | Reiter | 474/92 X |
| 4,036,351 | 7/1977 | Reiter | 198/499 |
| 4,269,301 | 5/1981 | Gibbs | 198/499 |
| 4,280,616 | 7/1981 | Wadensten | 198/499 |
| 4,365,706 | 12/1982 | Bright | 198/499 |
| 4,529,084 | 7/1985 | Zhang | 198/499 |
| 4,586,600 | 5/1986 | Lindbeck | 198/499 |
| 4,633,999 | 1/1987 | Perneczky | 198/499 |

FOREIGN PATENT DOCUMENTS

| 955649 | 4/1978 | U.S.S.R. | |
| 2078185 | 1/1982 | United Kingdom | 15/256.5 |

Primary Examiner—Kenneth J. Dorner
Assistant Examiner—José V. Chen
Attorney, Agent, or Firm—Arnold, White & Durkee

[57] ABSTRACT

A conveyor belt scraper unit has two pairs of arms for connection to fixed supporting structures on either side of a conveyor belt. The two arms of each pair can be pivoted with respect to one another. One arm carries a reaction roller on one side of the belt and the other arm carries scraper blades. A spring urges the arms together so that the scraper blades scrape the belt in opposition to the roller. The various components of the unit are manufactured from corrosion-resistant materials, making the unit eminently suitable for use in corrosive atmospheres.

10 Claims, 3 Drawing Sheets

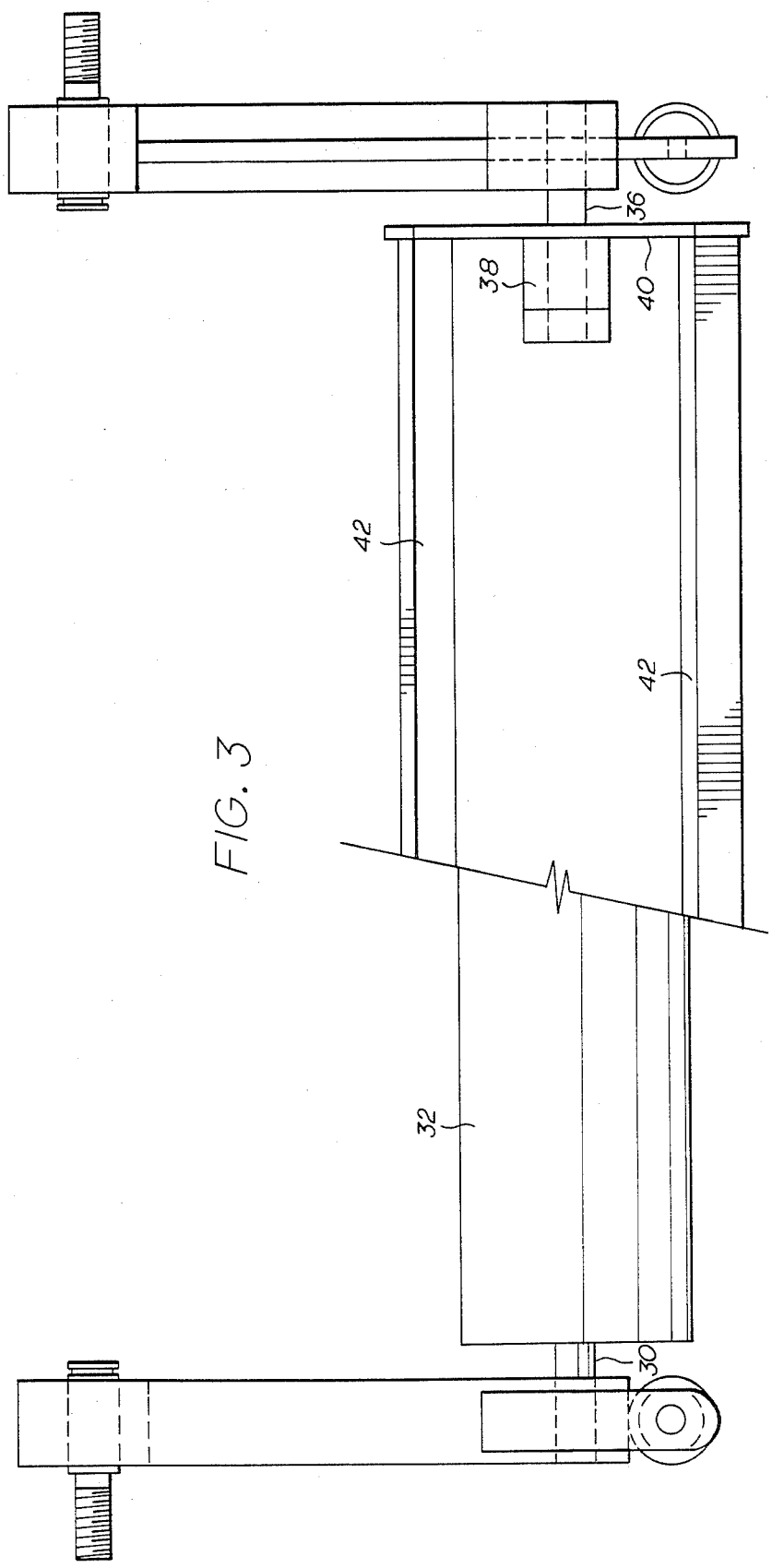

CONVEYOR BELT SCRAPER UNITS

BACKGROUND TO THE INVENTION

THIS invention relates to conveyor belt scraper units.

It is common practice to scrape the underside of the bottom run of a conveyor belt in the vicinity of the discharge pulley so as to prevent material accumulations on the belt which will result in idler damage and undesired material build-up alongside the belt path. Efficient scraping of the belt surface requires that a scraper blade be pressed against the belt with sufficient force. This can be difficult to achieve where the belt has an uneven surface e.g. as a result of protruding belt splices.

Thus, already proposed scraper units have the scraper blades loaded by springs to give them sufficient flexibility to take account of sudden variations in the belt surface. However, the known spring-loaded units suffer from the disadvantage that their components are prone to corrosive attack in corrosive atmospheres. Further, the complexity of the components makes them unsuitable for fabrication using corrosion-resistant materials, such as stainless steel.

The present invention seeks to provide an alternative design of scraper unit which can be formed from corrosion resistant materials.

SUMMARY OF THE INVENTION

The invention provides a conveyor belt scraper unit which comprises two pairs of arms for connection to fixed supporting structures on either side of a conveyor belt, the two arms of each pair being pivotable with respect to one another about a laterally extending axis, one arm of each pair being adapted to support on end of a reaction roller which will, in use, bear on one surface of the belt and the other arm of each pair being adapted to carry at least one scraper blade the scraping edge of which will, in use, bear on the other surface of the belt in opposition to the roller, and a spring acting between the two arms of each pair to urge them together.

Preferably, the arm of each pair which is adapted to carry at least one scraper blade carries two scraper blades spaced apart from one another. The scraper blade carrying arm may carry a first scraper blade having at least its scraping edge formed of a hard material and a second blade having at least its scraping edge formed of a relatively softer material. Alternatively, each blade can be formed of a combination of hard and soft material to suit the particular application.

BRIEF DESCRIPTION OF THE DRAWINGS

FIG. 3 shows a plan view of the unit of the preceding FIGS. certain parts being omitted for clarity.

DESCRIPTION OF A PREFERRED EMBODIMENT

Figure 2:
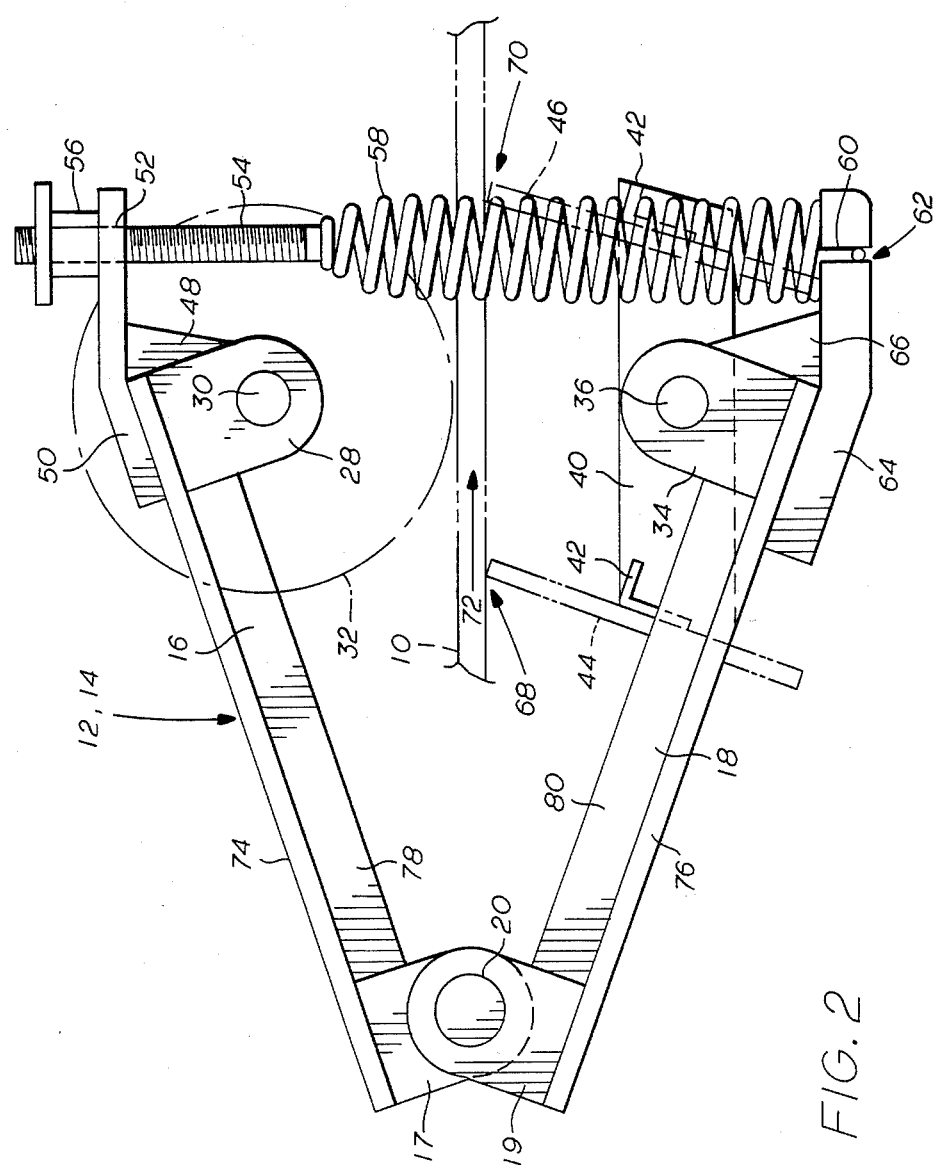
FIG. 2 shows an end view of the unit of FIG. 1, certain parts being omitted for clarity.

The illustrated scraper unit is intended for scraping the underside of the return run of a conveyor belt 10 seen in broken outline in FIG. 2. The unit includes two pairs 12,14 of arms, one pair being situated on each side of the conveyor belt 10. The two pairs of arms are identical to one another, and the details of one pair are seen in FIG. 2.

Figure 1:
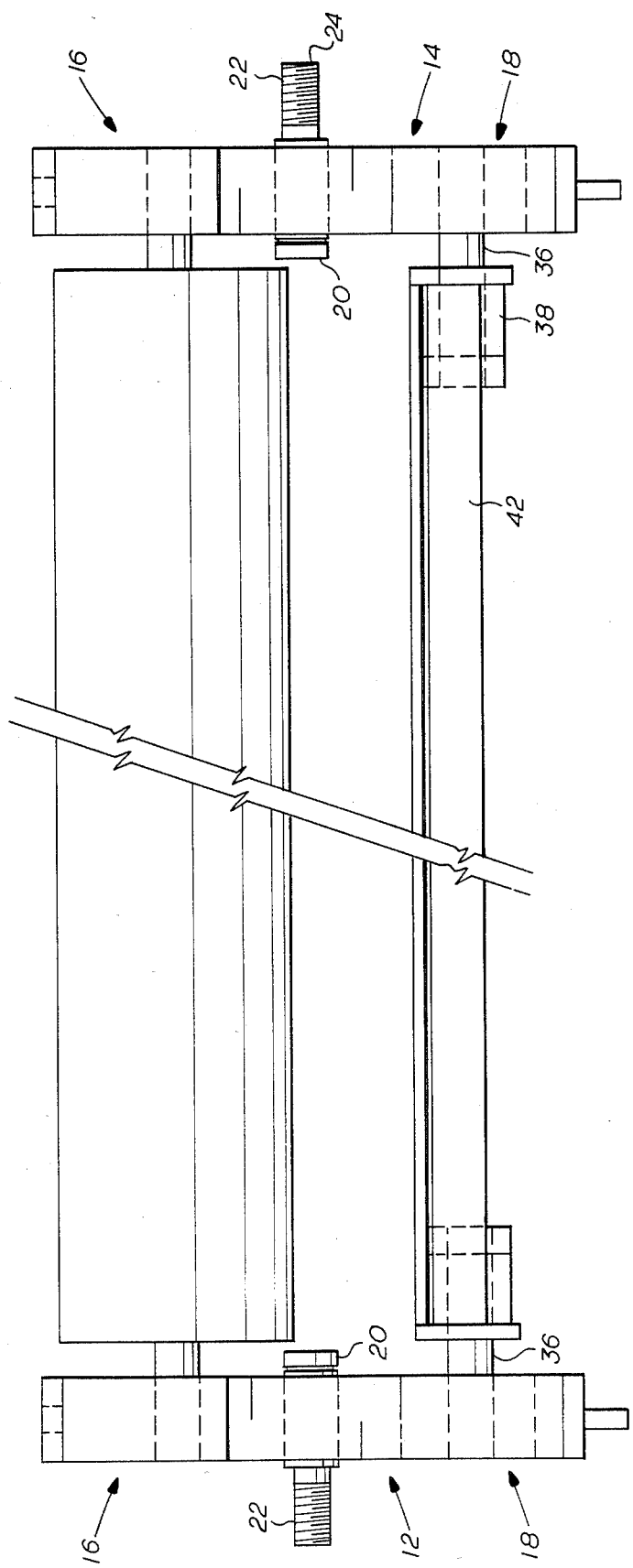
FIG. 1 shows a front view of a conveyor belt scraper unit in accordance with the invention.

In FIG. 2, the pair of arms is constituted by first arm 16 and a second arm 18. At a first end of the arm 16 is a bracket 17 and at the corresponding end of the arm 18 is a bracket 19. The brackets 17 and 19 are connected to one another in pivotal fashion by means of a pin 20. The pin 20 has a free, threaded end 22 (FIG. 1) which is connected to a fixed supporting structure (not shown) which are pivoted to one another through lugs 17,19 by means of a pin 20 the free, threaded end 22 of which is fastened to a fixed supporting structure (not shown). The arms 16,18 are therefore free to pivot with respect to one another about a lateral axis 24. At the free end of the arm 16, there is a gusseted lug 28 which serves to support the axle 30 at one end of a reaction roller 32 seen partially in FIG. 3 and in broken outline in FIG. 2. The roller extends across the belt with the axle at its opposite end supported by a corresponding arm 16 of the other pair of arms on the opposite side of the belt.

At the free end of the arm 18 is a gusseted lug 34 to which is fixed a pin 36. The pin 36 is rotatable in a bush 38 which is fixed to a flat bar 40. Extending between the flat bars 40 on opposite sides of the belt 10 are two angle brackets 42 to each of which is bolted a scraper blade 44,46. The blades extend for the full width of the belt 10 in a generally upward direction towards the underside of the belt.

Fixed to the end of the arm 16 and supported by the gusset 48 is a bracket 50 formed with a hole 52 near its free end. A threaded shank 54 fitted with a nut 56 passes through the hole 52 and has its lower end swaged to the upper end of a tension coil spring 58. A hook 60 at the lower end of the spring 58 locates in a cut-out 62 at the free end of a bracket 64 fixed to the end of the arm 18 and supported by the gusset 66. Thus it will be seen that the action of the spring 58 is to draw the ends of the arms 16,18 towards one another, so causing the scraping edges 68,70 of the scraper blades 44,46 to bear resiliently against the underside of the belt in opposition to the roller 32. The result is effective scraping of the belt underside.

Note that the spring tension is adjustable by appropriate manipulation of the nut 56 on the shank 54.

The direction of belt travel is indicated by the arrow 72 in FIG. 2. The upstream scraper blade 44 can be formed of a harder material than the downstream scraper blade 46. The upstream blade, or at least its scraping edge 68, can, for instance, be formed of steel, tungsten or a ceramic material. The downstream blade 46, or at least its scraping edge 70, can be formed of a plastics material, such as polyethylene or polyurethane, or of rubber, possibly with a metal backing. Each blade can be formed of a combination of hard and soft material to suit the particular application. The harder blade will dislodge from the underside of the belt the majority of the adhering material, while the softer blade will effect final cleaning.

The illustrated unit is suitable for use even in corrosive atmospheres. The arms 16,18 are both fabricated as T-sections, with flanges 74,76 and webs 78,80. Both the flanges and webs are flat bars of 3Cr12 or stainless steel. Similarly, the various lugs and pins in the unit are formed of corrosion-resistant steel, such as 3Cr12 or stainless steel. The nut, shank and spring are of stainless steel, and the angle brackets 42 and flat bars 40 are of 3Cr12 or stainless steel. The roller 32 is of stainless steel.

I claim:

1. A conveyor belt scraper unit for scraping the underside of the return run of a conveyor belt having a top and bottom side, and a first and second end, said unit comprising:

a first pair of inclined arms positioned on the top side of said belt and connected about a pivot means to a second pair of inclined arms positioned on the bottom side of said belt, the pivot means allowing the first and second arms to pivot relative to one another about an axis traverse to the direction of movement of said belt;

a reaction roller rotatably carried between said first arms so as to bear upon the top side of said belt;

two scraper blades carried between said second arms so as to bear upon the bottom side of said belt, one scraper blade being situated upstream of the reaction roller, and the second blade being situated downstream of said roller;

said scraper blades having scraping edges, the scraping edge of the upstream blade being of a harder material than the scraping edge of the downstream blade; and a resilient tension means coupled between the first and second arms so as to urge said arms in contacting relation with said belt.

2. the scraper unit of claim 1, wherein the scraping edge of the upstream scraper blade is made of steel, tungsten or a ceramic material.

3. The scraper unit of claim 2, wherein the scraping edge of the downstream scraper blade is made of rubber or plastics material.

4. The scraper unit of claim 2, in which each blade comprises a combination of hard and soft material.

5. The scraper unit of any one of the preceding claims, in which both arms of each pair are formed of a corrosion-resistant steel.

6. The scraper unit of claim 5, in which the corrosion-resistant steel is 3Cr12.

7. The scraper unit of claim 5, in which both arms of each pair are formed from flat sections of the corrosion-resistant steel.

8. The scraper unit of claim 1 including a reaction roller of stainless steel.

9. The scraper unit of claim 1 in which the spring force of the spring is adjustable.

10. The scraper unit of claim 9, in which the spring is of stainless steel.

* * * * *